(12) United States Patent
Subburaj et al.

(10) Patent No.: US 11,194,017 B2
(45) Date of Patent: *Dec. 7, 2021

(54) FIELD MONITORING OF ANALOG SIGNALS IN A RADAR SYSTEM

(71) Applicant: Texas Instruments Incorporated, Dallas, TX (US)

(72) Inventors: Karthik Subburaj, Karnataka (IN); Indu Prathapan, Karnataka (IN); Karthik Ramasubramanian, Karnataka (IN); Brian P. Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,262

(22) Filed: Aug. 4, 2020

(65) Prior Publication Data
US 2020/0363502 A1    Nov. 19, 2020

Related U.S. Application Data

(63) Continuation of application No. 15/333,593, filed on Oct. 25, 2016, now Pat. No. 10,768,278.

(51) Int. Cl.
*G01S 7/40* (2006.01)
*G01S 13/34* (2006.01)

(52) U.S. Cl.
CPC .......... *G01S 7/4004* (2013.01); *G01S 7/4008* (2013.01); *G01S 7/4021* (2013.01); *G01S 13/34* (2013.01); *G01S 7/4013* (2021.05)

(58) Field of Classification Search
CPC .............................. G01S 7/4004; G01S 7/4008
See application file for complete search history.

(56) References Cited

U.S. PATENT DOCUMENTS

| | | | | |
|---|---|---|---|---|
| 7,397,419 B2* | 7/2008 | Nakano | ................. | G01S 7/4021 342/173 |
| 7,705,773 B2* | 4/2010 | Vacanti | ..................... | G01S 7/35 342/169 |
| 8,264,401 B1* | 9/2012 | Kavaler | .................. | G01S 7/288 342/128 |
| 9,197,223 B2 | 11/2015 | Matsumura | | |

(Continued)

*Primary Examiner* — Marcus E Windrich
(74) *Attorney, Agent, or Firm* — Ebby Abraham; Charles A. Brill; Frank D. Cimino

(57) ABSTRACT

A FMCW radar system with a built-in self-test (BIST) system for monitoring includes a receiver, a transmitter, and a frequency synthesizer. A FMCW chirp timing engine controls timing of operations at least one radar component. The BIST system includes at least one switchable coupling for coupling a first plurality of different analog signals including from a first plurality of selected nodes in the receiver or transmitter that are all coupled to a second number of monitor analog-to-digital converters (ADCs). The second number is less than (<) the first plurality of different analog signals. The BIST system includes a monitor timing engine and controller operating synchronously with the chirp timing engine, that includes a software configurable monitoring architecture for generating control signals including for selecting using the switchable coupling which analog signal to forward to the monitor ADC and when the monitor ADC samples the analog signals.

8 Claims, 7 Drawing Sheets

(56) References Cited

U.S. PATENT DOCUMENTS

| | | | |
|---|---|---|---|
| 2014/0266865 A1* | 9/2014 | Doyle | G01S 7/354 |
| | | | 342/174 |
| 2015/0276919 A1* | 10/2015 | Matsumura | H01Q 1/3233 |
| | | | 342/175 |
| 2015/0362584 A1* | 12/2015 | Jenkins | G01S 7/4056 |
| | | | 342/171 |
| 2017/0090015 A1* | 3/2017 | Breen | G01S 7/032 |

\* cited by examiner

FIELD MONITORING OF ANALOG SIGNALS IN A RADAR SYSTEM

CROSS-REFERENCE TO RELATED APPLICATION(S)

This application is a continuation and claims priority to U.S. patent application Ser. No. 15/333,593, filed Oct. 25, 2016, which is hereby incorporated herein by reference.

FIELD

Disclosed embodiments relate to dynamic field monitoring of analog signals in radar systems.

BACKGROUND

A conventional radar sensor unit (radar system) comprises a transceiver circuit having a transmitter including a waveform generator and an analog front end (AFE) including an amplifier and a receiver that includes an AFE (amplifier, mixer, and filter) and an analog-to-digital converter (ADC). The radar system also includes a signal processing module/unit, such as a digital signal processor (DSP) or a microcontroller unit (MCU). A radar chip may provide all these components, except perhaps the signal processing module/unit and antenna(s).

Data processing in a frequency-modulated continuous-wave (FMCW) radar system is performed on a system cycle/frame basis. A FMCW frame includes N (number) of FMCW ramps/chirps. A chirp is a smallest logical unit of data used for FMCW radar processing.

One application for such radar systems is for automotive collision avoidance. In these radar systems, during field operation, the AFE circuits need to be continually monitored to detect failures and/or to improve their performance. In particular, preventing a malfunction in the radar system can be important, and the ability to monitor a failure during radar operation is a desirable feature. In order to satisfy such requirements, a built-in self-test (BIST) circuit or system may be included to test the transceiver circuit during radar system operation.

SUMMARY

This Summary briefly indicates the nature and substance of this Disclosure. It is submitted with the understanding that it will not be used to interpret or limit the scope or meaning of the claims.

Disclosed embodiments recognize although BIST systems are known for testing transceiver circuits of radar systems, such known BIST systems have at least two limitations. Known BIST systems are generally not time-aligned to the radar chirps of the radar system. This means transient failures/behaviors of signals which occur only during radar chirps, but not at other times, cannot be detected. Moreover, known BIST systems do not provide instantaneous monitoring of multiple analog signals in multiple system states through a common ADC.

Disclosed embodiments include methods and apparatus that monitor analog signals in transceivers of radar systems to achieve dynamic RF and AFE circuit monitoring for detecting failures and/or to improve radar system performance. A method of monitoring a radar system includes switchably coupling a first plurality of different analog signals including from a first plurality of selected nodes in a receiver or a transmitter of the radar system that are all coupled to a second number of monitor ADCs of a built-in self-test (BIST) system. The second number is less than (<) the first plurality of different analog signals. A first of the first plurality of different analog signals is selected to forward to the monitor ADCs. Samples output by the monitor ADC are processed for extracting statistics therefrom, and the selecting and processing are repeated for at least a second of the different analog signals. Statistics are used for at least one of detecting a failure in (e.g., through threshold comparison) and calibrating of the radar system (e.g. updating RF buffer bias settings to improve signal swing/signal to noise ratio (SNR)).

Another disclosed aspect comprises the monitoring the analog signals time-aligned to functional radar chirps. Yet another disclosed aspect comprises the instantaneous monitoring of multiple analog signals in multiple system states through a number of ADCs that is less than less than the number of different analog signals, such as using only one single common monitor ADC for all the different analog signals in one particular embodiment.

BRIEF DESCRIPTION OF THE DRAWINGS

Reference will now be made to the accompanying drawings, which are not necessarily drawn to scale, wherein.

DETAILED DESCRIPTION

Figure 1:
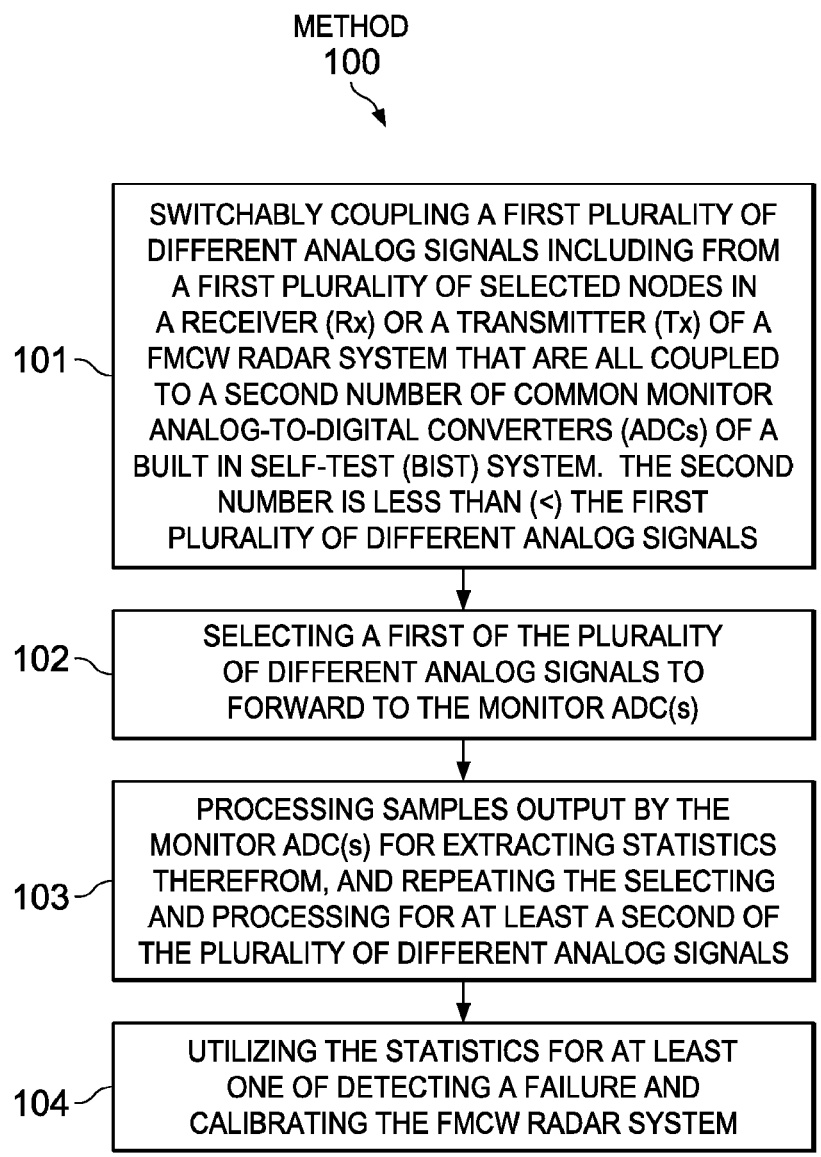
FIG. 1 is a flow chart that shows steps in an example method of monitoring a FMCW radar system, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow chart that shows steps in an example method 100 of monitoring a FMCW radar system, according to an example embodiment. Step 101 comprises switchably coupling (e.g., by the multiplexer (MUX) 285 shown in FIG. 2B below and/or by the switches (S1-S7) shown in FIG. 2A below) a first plurality of different analog signals including from a first plurality of selected nodes in a receiver (Rx) or a transmitter (Tx) of the radar system that are all coupled to a second number of common monitor ADCs of a BIST system. The second number is less than (<) the first plurality of different analog signals. The analog signals can comprise, for example, common mode voltages of amplifier outputs, temperature sensor output voltages, RF signal swing sensor (power detector) output voltages, power supply circuits output voltages, synthesizer and phase locked loop (PLL)'s VCO control voltages. The radar sub-systems can include Tx RF or IF, Rx RF or IF, power management, synthesizer, or the PLL.

Step 102 comprises selecting (typically one at a time) a first of the plurality of different analog signals to forward to the monitor ADC(s). Step 103 comprises processing samples output by the monitor ADC(s) for extracting statistics (e.g., a minimum, maximum and average) therefrom, and repeating the selecting and processing for at least a second of the plurality of different analog signals. Step 104 comprises utilizing the statistics for at least one of detecting a failure (e.g., through a threshold comparison) and calibrating the radar system (e.g., updating RF buffer bias settings to improve signal swing/SNR). Method 100 can monitor one hundred (100) or more critical signals in a typical FMCW radar system, including ten (10) or more signals during chirping.

Figure 2A:
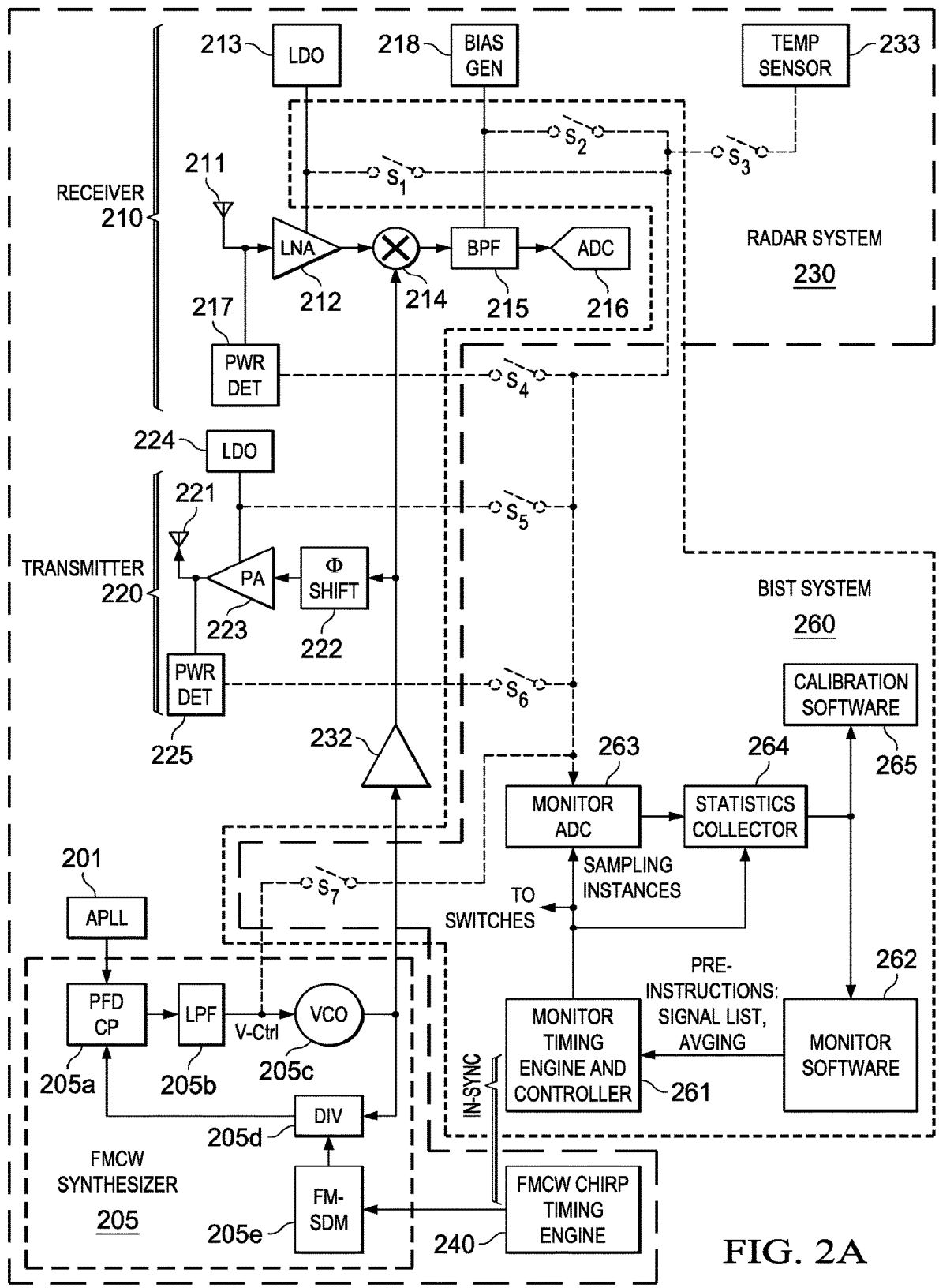
FIG. 2A is block diagram of an example 1RX-1TX FMCW radar system that includes a disclosed BIST system which utilizes switches to provides real-time monitoring or calibration including for the AFE circuitry.

FIG. 2A is block diagram of an example 1RX-1TX FMCW radar system 230 that includes a disclosed BIST system 260 coupled thereto through switches shown as S1-S7 having a single monitor ADC 263. BIST system 260 provides real-time monitoring or calibration for multiple analog signals within the FMCW radar system 230 that can be used to implement method 100. Method 100 as noted above provides dynamic circuit monitoring to detect failures and/or to improve performance of the FMCW radar system 230.

Although the FMCW radar system 230 is shown having only 1 Rx 210 and 1 Tx 220, as known in the art of radar, there can be 2 or more of each of the Rx and Tx channels. FMCW radar system 230 includes an analog phase lock loop (APLL) 201 coupled to a FMCW synthesizer 205. The FMCW synthesizer 205 includes phase frequency detector (PFD) and charge pump (CP) shown collectively as 205a, a low pass filter (LPF) 205b and a voltage controlled oscillator (VCO) 205c in the forward path, and a frequency divider (DIV) 205d in the reverse path. FMCW synthesizer 205 is configured to generate a FMCW signal, which is a signal whose frequency starts at a controllable frequency, and varies linearly with time at a controllable rate or slope, for a controllable time duration. This operation of generating such an FMCW signal is simply called frequency ramping or "chirping". FMCW synthesizer 205 is also shown including a FM-Sigma-Delta Modulator (SDM) block 205e that is coupled to receive a timing control signal from the FMCW radar chirp timing engine shown as FMCW chirp timing engine 240.

Rx 210 is shown including a receive antenna 211. A low noise amplifier (LNA) 212 is shown driven by a low-dropout (LDO) regulator 213 which is a DC linear voltage regulator that can regulate the output. The output of the LNA 212 is coupled to a mixer 214 having an output coupled to the input of the band pass filter (BPF) 215. The mixer 214 receives the FMCW signal from the FMCW synthesizer 205 after buffering by a buffer 232. Blocks 211-214, BPF 215 and bias generator 218 may all be considered the AFE of the Rx 210.

The mixer 214 down-converts the received RF signal. The output from the BPF 215 is coupled to an ADC 216. Although not shown, the output of the ADC 216 may be coupled to a decimator (e.g., fast Fourier transform (FFT)-based for decimating down the radar signal to the required sampling rate) then to a buffer, then to a DMA coupled to a processor by a high speed interface (HSI) which can comprise low-voltage differential signaling (LVDS) or a camera serial interface (CSI), such as CSI-2. The output of the processor can be coupled to the input of an engine control unit (ECU) which may be provided to support an engine control function including collision avoidance based on processing the radar data. In an engine control application, the processor processes the radar data frame-by-frame to determine the range, velocity and angle of any obstacle/vehicle in front of the radar system of the vehicle.

The Rx 210 is also shown including a power detector 217 coupled to an input of the LNA 212 and a bias generator 218 coupled to an input of the BPF 215. The Tx 220 includes a transmitter antenna 221 and a phase shifter 222 that is coupled to receive the FMCW signal from the FMCW synthesizer 205 after buffering by the buffer 232. The output of the phase shifter 222 is coupled to a power amplifier (PA) 223 that is driven by LDO 224, where the PA 223 drives the Tx antenna 221.

The FMCW chirp timing engine 240 controls the timing of the entire FMCW radar system 230. For example, it controls when the FMCW synthesizer 205 should start ramping and stop ramping, when the $T_X$ 220 and $R_X$ 210 should be enabled, when the ADC 216 samples should be collected for further processing to determine the presence and position of objects around the radar system. For this purpose, the FMCW chirp timing engine 240 generates one or more timing control signals and provides them to various components of the radar system 230. One of the timing control signals is called "Chirp Start" that indicates the start of each chirp and may for example, control when then frequency ramping of each of the several chirps shown in FIG. 3 starts. Aligning the timing of monitoring of various analog signals in the FMCW radar system 230 at a controllable timing offset from the chirp start signal is generally called chirp aligned monitoring herein and a software controllable architecture for chirp aligned monitoring is described herein.

FMCW radar system 230 is shown also including at least one temperature (Temp) sensor 233 that can be placed anywhere on the radar system chip, as well as a plurality of switches (S) coupled to various nodes shown as S1 to S7. FIG. 2A shows these switches comprising $S_1$ at the output node of the LDO regulator 213, $S_2$ at output node of the bias generator 218, $S_3$ to the output of the T sensor 233, $S_4$ to the output node of the power detector 217, $S_5$ to the output node of the LDO 224, $S_6$ to the output node of the power detector 225, and $S_7$ at the node between the LPF 205b and the VCO 205c.

The FMCW radar system 230 (except in some embodiments the antennas 211, 221) and BIST system 260 too can all be formed on a common substrate that has a semiconductor surface, such as a bulk silicon substrate or a bulk silicon substrate having a silicon epitaxial layer thereon.

FMCW radar system 230 can be realized as a complementary metal oxide semiconductor (CMOS) chip formed on a semiconductor surface. The substrate may also generally comprise other materials, such as elementary semiconductors besides silicon including germanium. The substrate may also generally comprise a compound semiconductor material.

The BIST system 260 is shown including a monitor timing engine and controller 261 that is coupled to be synchronized with the FMCW chirp timing engine 240. A monitoring software block 262 pre-programs the list of signals to be monitored and their timing information into the monitor timing engine and controller 261, for example, which signals to monitor, their measurement order, settling time before measurement, and the number of samples to average. During the radar chirps for chirp-aligned radar system monitoring or inter-frame durations for inter-chirp radar system monitoring, the monitor timing engine and controller 261 forwards appropriate nodes into the monitor ADC 263 at appropriate times, by enabling the appropriate buffers and switches (shown as $S_1$ to $S_7$) in the multiplexing path. Although not shown in FIG. 2A, the buffers in the FMCW radar system 230 function as repeaters that preserve at their output the signals received at their input.

Buffers may be positioned at any or all of the dashed lines containing the switches S1-S7 shown in FIG. 2A. Some buffers may act as repeaters that preserve their input voltage information on their output voltage. Some buffers may act as current to voltage converters where their input current information is provided at their output voltage with a typically known scaling resistance scale factor. Some buffers may act as programmable gain amplifiers which amplify the buffer input by a known (fixed or programmable) gain or factor forward to the monitor ADC 263. Buffers may also have a functionality of providing a high impedance at its output, such that its input is not forwarded to its output, based on the buffers control signals. All these functionalities are collectively referred to herein as being provided by buffers, and each buffer in a disclosed FMCW radar system may have one or more or none of these functionalities.

The monitoring software block 262 collects statistics from the statistics collector block 264 that are generated from outputs from the monitor ADC 263, such as minimum, maximum, average of various signals. These statistics can be used for failure detection (e.g., through threshold comparison) and/or calibrations performed by the calibration software block 265, such as updating RF buffer bias settings to improve the signal swing or to improve the SNR.

Figure 2B:
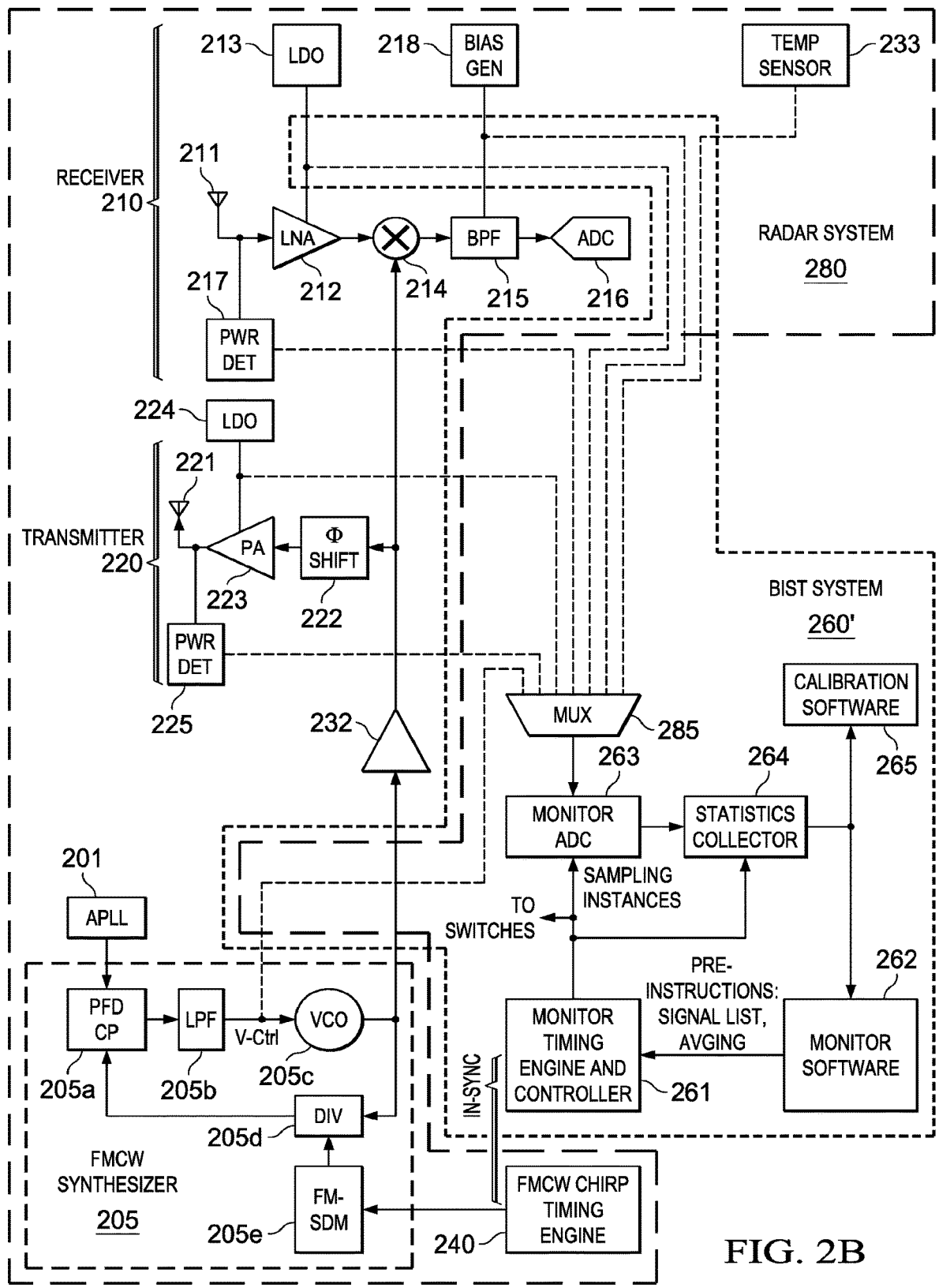
FIG. 2B is block diagram of an example 1RX-1TX FMCW radar system that includes a disclosed BIST system which utilizes a multiplexer to provide real-time monitoring or calibration including for the AFE circuitry.

FIG. 2B is block diagram of an example 1RX-1TX FMCW radar system 280 that includes a disclosed BIST system 260' which utilizes a MUX 285 to provide real-time monitoring or calibration including for the AFE circuitry. MUX 285 replaces the switches S1-S7 in FIG. 2A and has its output coupled to the monitor ADC 263.

Figure 3:
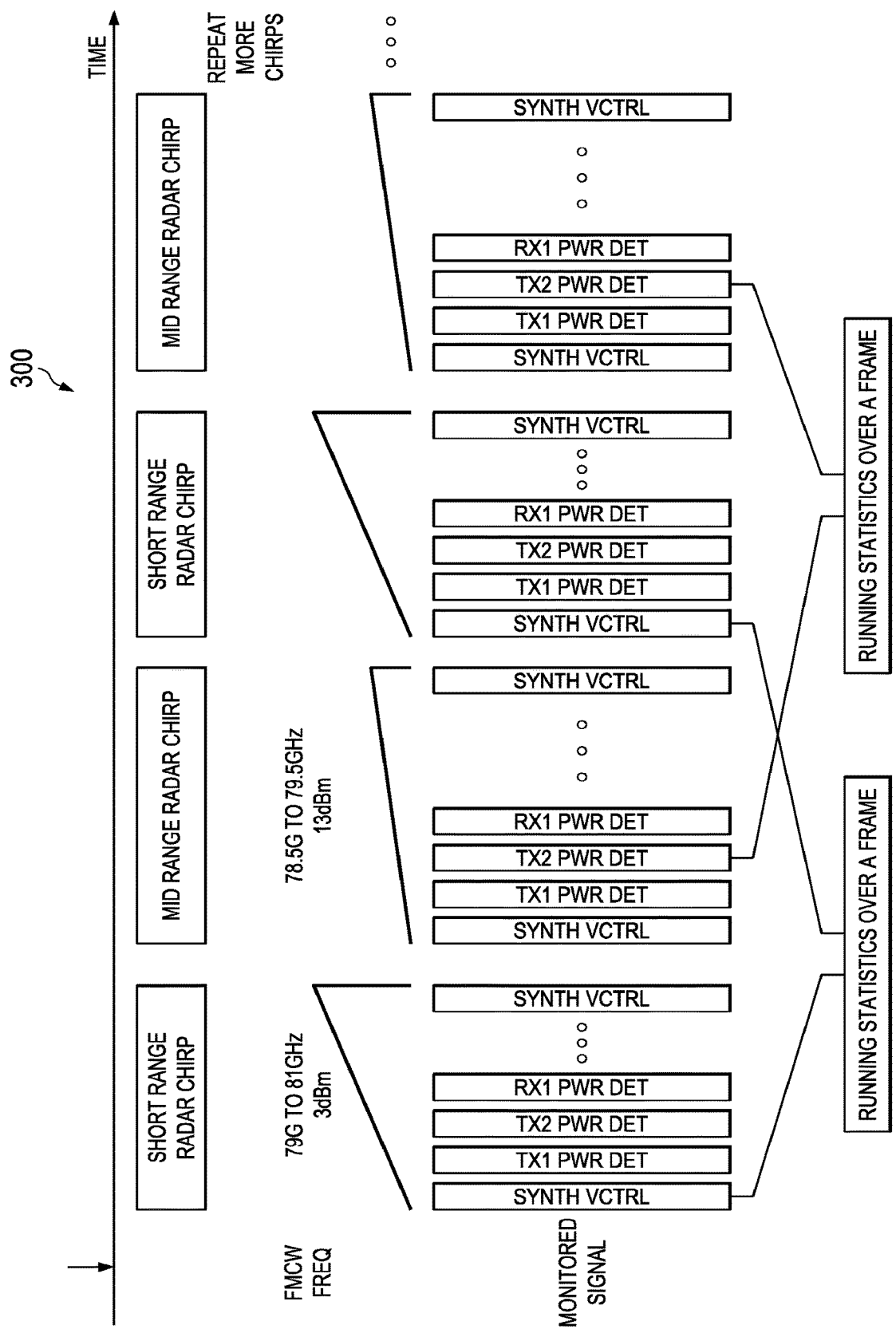
FIG. 3 shows a timeline for chirp aligned monitoring, according to an example embodiment.

FIG. 3 shows an example timeline 300 for chirp-aligned FMCW radar system monitoring, according to an example embodiment. This example shows disclosed FMCW radar system monitoring for frames that include interleaved short-range radar (SRR) chirps from 79 GHz to 81 GHz at 3 dBm power and mid-range radar (MRR) chirps from 78.5 GHz to 79.5 GHz at 13 dBm power. The monitor software block 262 (in FIGS. 2A and 2B) configures a signal list that provides a listing of the monitored signals and timing for the monitor timing engine and controller 261 (in FIGS. 2A and 2B) before the frame. A chirp is the transmission of the electromagnetic wave whose frequency varies linearly, such as from 79 GHz to 81 GHz in a duration of say, 100 μs. In FMCW radar, a frame may refer to a quick succession or series of chirps of one kind or many kinds. For example, a frame may contain 40 successive identical chirps, each of 100 μs duration and an inter-frame duration of say, 1 ms. Such frames may get repeated multiple times in a typical radar operation. Chirps getting repeated in a frame may be identical or not. Frames getting repeated in a radar operation may be identical or not. The monitoring techniques described herein are applicable during the inter-frame times as well as during the chirps.

Since there may not be available sufficient time for software to interfere and control the monitor ADC 263 for each parameter and between chirps, in disclosed embodiments the software programs, before the start of a frame provide the information needed for the monitoring timing engine and controller 261 to perform the required monitoring during the chirps and the frame. The information is basically an ordered list of signals to monitor during the subsequent frame of chirps, including any settling time before measuring any parameter after each parameter change, since many signals are measured one after another, and the number of time to sample for each measurement, just to improve the SNR in the measurement. The remainder of the intra-chirp/frame monitor orchestration is generally performed autonomously by monitor timing engine and controller 261.

For example, during each radar frame, a monitor FSM which can realize the BIST system 260 may maintain a running average, minimum, and maximum of FMCW radar system parameters including:

1. for FMCW Synthesizer 205 the VCO 205c voltage at the chirp start (e.g. 0.1V);
2. for FMCW Synthesizer 205 the VCO 205c voltage at the chirp end (e.g. 0.9 V);
3. Tx 220 Power, Rx 210 Power (e.g. 10 dBm);
4. LNA 212 bias signals, and
5. Temperature from the temperature sensor 233.
6. Output common mode voltages of amplifiers such as LNA 212.

The FMCW radar system parameters 1-3 above can be used to determine whether the VCO 205c is operating out of range. Parameter 3-4 can be used to determine whether the radar system 230 is transmitting at a sufficient level of power. These radar system parameters are maintained for each profile in the frame, with separate statistics over the frame being generated for the SRR and the MRR chirps in this example. At the end of frame, the monitor software block 262 compares the statistics obtained with stored allowed thresholds.

Regarding a "profile" as used herein, a frame as described above can contain many identical or non-identical chirps. Each kind of chirp is one profile. A profile is a unique identification for TX output power=say 3 dBm, FMCW frequency range=79 GHz to 81 GHz, FMCW slope=2 GHz/100 μs, chirp duration=100 μs, $R_X$ LNA 212 gain=say 30 dB, RX BPF 215 cutoff frequencies=say 500 KHz to 5 MHz. A profile is given a name such as SRR Profile (for the abovementioned profile) which can be seen in association with FIG. 3 which shows the time line of a frame containing chirps of alternate SRR and MRR (Medium Range Radar) profiles. An MRR profile may be defined as TX output power=say 13 dBm, FMCW frequency range=78.5 GHz to 79.5 GHz, FMCW slope=1 GHz/130 μs, chirp duration=130 μs, RX LNA gain=say 40 dB, RX BPF cutoff frequencies=say 300 KHz to 7 MHz.

These profile details are given to the FMCW radar system 230 or 280 including all the mm wave/analog components and FMCW timing engine. The FMCW timing engine and controller 261 controls all the mm wave/analog and digital blocks based on the timing and other instructions which are part of this profile definition. A frame, as describes above, may contain many identical or non-identical chirps. A frame may also refer to a set of chirps occurring between when monitoring software configures various hardware components of the monitoring architecture and when it accesses the results from the same.

Figure 4:
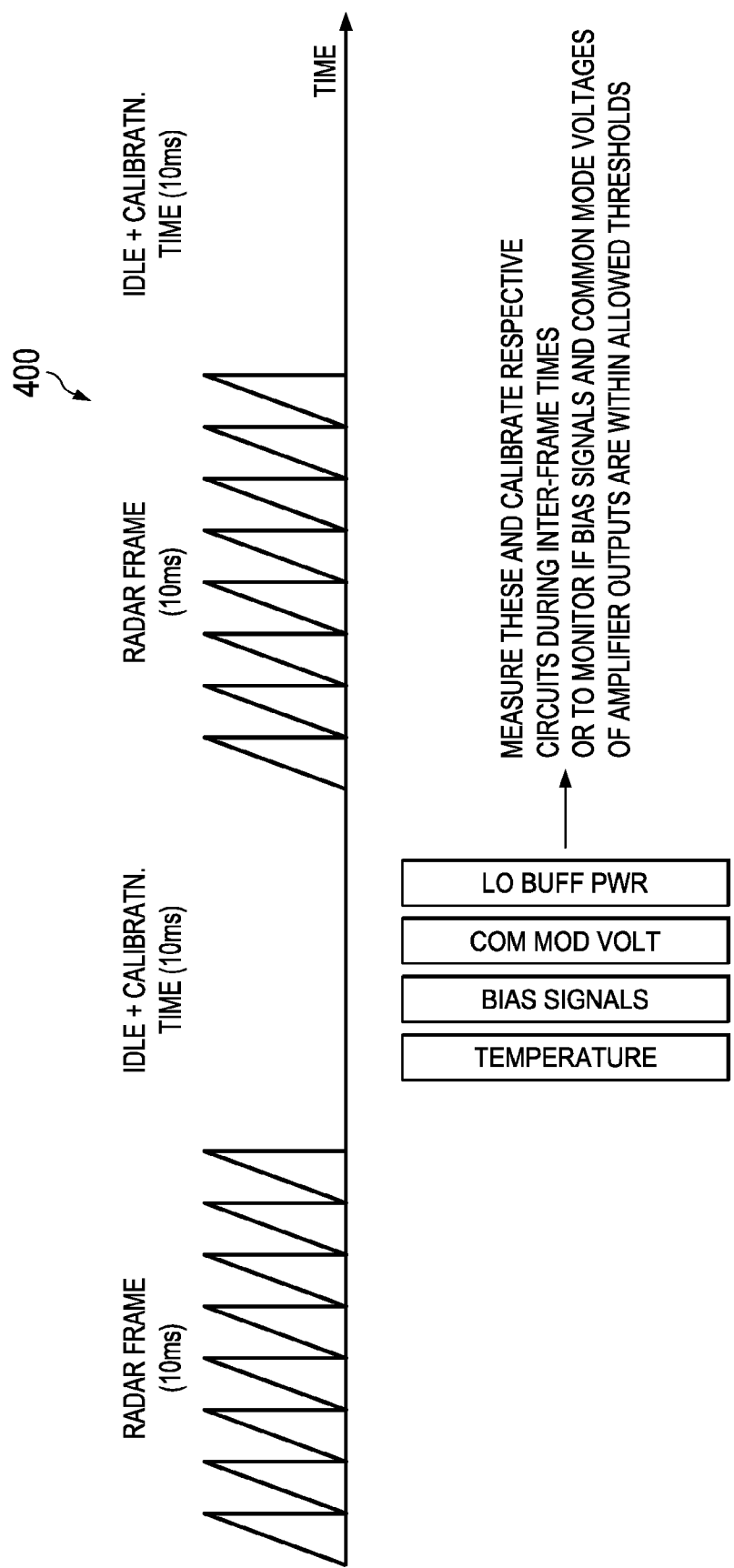
FIG. 4 shows a timeline for usage in inter-frame calibration/monitoring, according to an example embodiment.

FIG. 4 shows an example timeline 400 for usage in inter-frame FMCW radar system calibration or monitoring, according to an example embodiment. Example radar frames are shown being 10 ms long, with a 10 msec inter-frame time between the frames. In this embodiment, calibration or monitoring is performed during the 10 msec inter-frame intervals. The signals shown (temperature, bias signals, common mode voltage, LO buffer power) are measured and calibrated during inter-frame times or to monitor to determine if bias signals and common mode voltages of amplifier outputs are within allowed thresholds. An example list of signals that can be multiplexed to monitor can comprise the following:

Common mode voltages of amplifier outputs, temperature sensor 233 output voltages, RF signal swing sensor (power detector) output voltages, power supply circuits (LDO) 224 output voltages, FMCW Synthesizer 205 and the APLL's 201 VCO 205c control voltages. These are nodes are in various sub-systems in the FMCW radar system such as the Transmitter RF or IF, Receiver RF or IF, Power Management, Synthesizer, or APLL 201.

Figure 5:
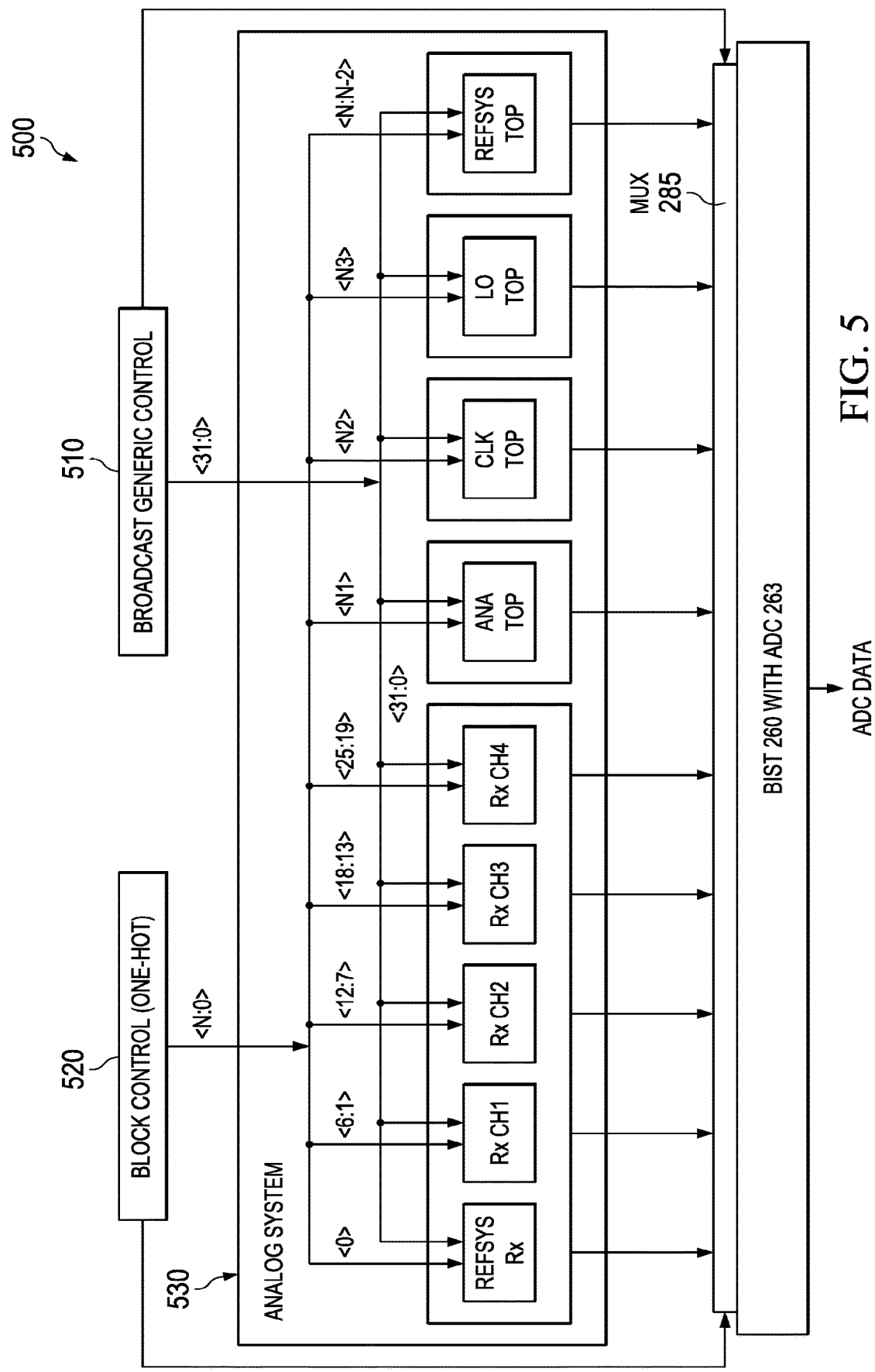
FIG. 5 shows an example multiplexing and control scheme in analog.

FIG. 5 shows an example multiplexing and control scheme 500 in analog from various subsystems of a FMCW radar system into a MUX 285 in series with an input of a single common monitor ADC 263 of a BIST system 260. Analog system 530 shown in FIG. 5 represents the analog, mm wave, and the RF blocks shown as FMCW radar system 230 in in FIG. 2A and FMCW radar system 280 in FIG. 2B. RX CH 1-4 shown represents 4 identical receiver channels. Although not shown, there can be TX CH 1-4 which represent 4 identical transmitter channels.

The block shown as CLK TOP represents an Analog Phase Lock Loop (APLL) and clock dividers and buffers system generating various clock signals for the various digital and analog sub systems in the radar system-on-a-chip (SoC). The block shown as REF SYS RX/TOP represents power supply, band gap and constant reference current and voltage generation circuits supplying them to various analog sub systems in the radar SoC. The block shown as LO TOP represents the local oscillator system containing a FMCW Synthesizer, and buffers and multipliers and dividers on its output which generate the input signal to TX channels and RX mixer components.

A one-hot encoded control signal (such as being 256 or 512 bits) generated by digital circuitry (such as the digital BIST FSM 600 shown in FIG. 6 described below) shown as block control (One-Hot) 520 is used to select from the analog blocks in analog system 530 to be currently under test. The broadcast generic control (generic control) signal shown as broadcast generic control 510 is changed to adjust the state of the radar system. Block control 520 is used to select the particular signal to be currently passed to the monitor ADC 263. Block control 520 and generic control 510 each represent digital signals generated by the monitor timing engine and controller 261 shown above in FIG. 2A and FIG. 2B. In general, the block control 520 provides the digital controls that control the buffers, switches (S1-S7) of FIG. 2A or MUX 285 in FIG. 2B which forward a desired analog signal to the monitor ADC 263 based on the current block control signal. This select arrangement avoids the need for complicated decoding logic inside the analog circuitry.

The broadcast generic control 510 (shown as 32 bits) is used to configure the internals of the selected analog block to adjust the state of the FMCW radar system. Having a single broadcast generic control 510 signal fanned out to all analog blocks under BIST simplifies the control in digital. The one-hot encoded signals from the block control 520 can be scattered and the generic control 510 can be duplicated multiple times on the periphery of the analog to avoid long routes inside the analog. A BIST FSM can provide the broadcast generic control 510 and the block control 520, such as the BIST FSM 600 in FIG. 6 described below.

As described above, the block control 520 basically controls which particular signal of which radar sub-system should get forwarded to the monitor ADC 263. One may want to further observe that signal under various states of operation of the radar SoC/analog, etc. The broadcast generic control 510 signal is used to enable the appropriate buffers and/or switches needed further to route the desired analog signal to the monitor ADC 263 and/or adjust the state and communicate that state. The generic control 510 signal which is broadcast to all blocks is applicable to a block of a radar sub-system only if the block control has enabled that block of that sub system.

In one example, to measure the TX output power through the TX power detector, the TX power amplifier output is forwarded to the monitor ADC by appropriately setting the block control 520. But the accuracy of the TX output power measurement may be improved by making two measurements in quick succession—a) one with the TX power amplifier output connected, giving an ADC reading V1=P1+O1, where P1=Actual TX power and O1=unknown Offset and b) another with it disconnected from the monitor ADC, giving an ADC reading V2=O1 and using the difference, V2-V1, between the two monitor ADC output readings to know the TX output power magnitude (P1) with greater accuracy than with only the a) part, due to O1 being constant or a relatively very slow varying noise. In this case, the generic control is first made to allow a) and then b) with a controlled timing, without changing the Block control and hence without changing the signal being forwarded to the monitor ADC.

In a radar system which has a large number of signals to monitor, this concept of block control 520 and broadcast generic control 510 allows reduction in the number of bits to store in the instruction packet (see 269a in FIG. 6) for each measurement. This is in conjunction with the fact that the block control 520 is in one embodiment stored in the instruction packet of 269a in binary form (e.g. if there are 255 signals to measure, use an 8 bit binary number to represent each signal) whereas, after a binary to one-hot conversion inside the monitor timing engine and controller 261, the block control 520 is passed in the form of a one-hot signal to the analog block, where only one signal in the one-hot block control is made one (others are zero) and it is directly connected in analog as e.g. the switch controls to all switches. A change in the block control 520 may cause high number of glitches in the monitor ADC 263 input path during any signal transition but a change in the generic control 520 may not cause such glitches and may be quicker.

In another embodiment/example the mux path for a particular signal being forwarded to the monitor ADC 263 may contain voltage amplifiers of programmable gains and the generic control may tell the desired gain during the measurement while the block control may just tell which signal should be forwarded through this programmable gain block into the monitor AD 263. In another embodiment, the programmable gain block may not be inside the MUX but be a part of one or more blocks in the sub-systems in the analog of FIG. 5 (same as FMCW radar system 280 shown in FIG. 2B).

The multiplexing scheme provided enables back-to-back instantaneous monitoring of multiple analog signals through a common monitor ADC 263. In an example implementation, 200 or more analog signals from 10+ radar sub-systems are forwarded to the monitor ADC 263 in a software configurable manner. This can be accomplished by using the one-hot select block control 520 shown as <N:0> to select a particular sub-system/node and an additional broadcast generic control 510 shown as <31:0> used to enable the appropriate buffers and/or switch the switches needed further to route the desired analog signal to the monitor ADC 263 and/or change the state of the FMCW radar system.

Figure 6:
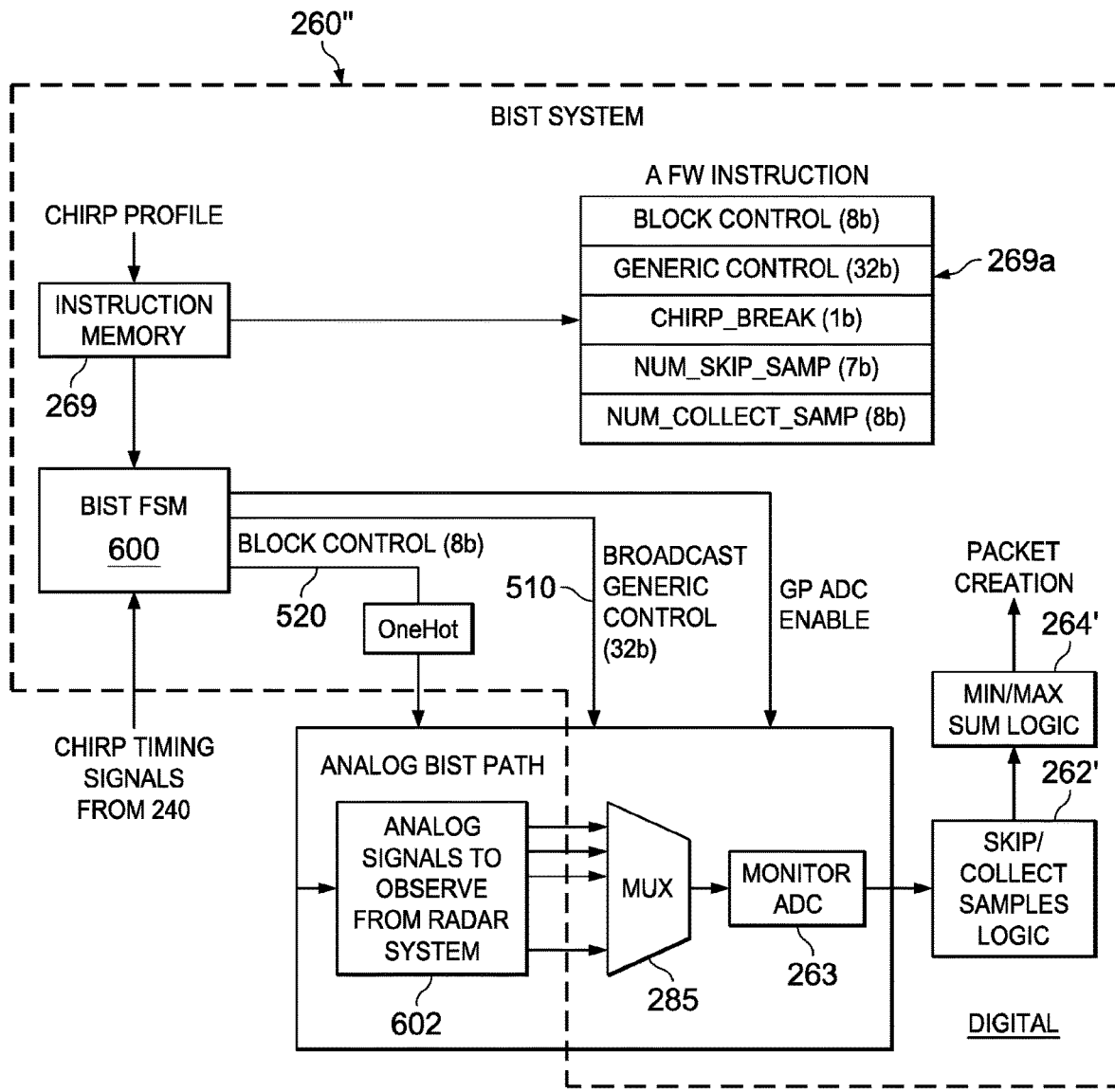
FIG. 6 shows a BIST system having a digital hardware BIST FSM functioning as a monitor timing engine that implements time aligned measurement of analog signals from a radar system by working in tandem with a FMCW chirping timing engine that it is synchronized with, according to an example embodiment.

FIG. 6 shows a BIST system 260" having a digital hardware BIST FSM (BIST FSM) 600 functioning as a monitor timing engine and controller 261 that implements time-aligned measurement of analog signals 602 from a radar system by working in tandem with a FMCW chirping timing engine 240 that it is synchronized with. The chirp start signal from the FMCW chirp timing engine 240 is provided to the BIST FSM 600 (see the "In-Sync" shown in FIGS. 2A and 2B). If desired, this arrangement enables the BIST FSM 600 to perform its functions time aligned to the chirp start signal, so that critical analog signals can be monitored when the functional radar chirps are on-going, such as at controllable timing offsets from the start of the chirps.

Control signals shown as the block control 520 one hot and broadcast generic control are shown, which are generated by the BIST FSM 600 for multiplexing out signals from a selected analog block of the FMCW radar system under test using MUX 285 that has its output coupled to the monitor ADC 263. Precise control of the sampling window is provided for monitoring various signals in the radar system within any given chirp/frame. The samples output by the monitor ADC 263 are coupled to a monitoring software block shown as skip/collect samples logic 262', then to a statistics block shown as min/max/sum logic 264' for signal processing to extract statistics such as minimum, maximum and average. This process is repeated for multiple analog signals.

Min/max/sum logic 264' is shown outputting packets by "packet creation" which comprises generating independent Statistics Results Memory (SRM) (containing these statistics independently for various signals, independently for different profiles in the frame. The SRM is a collection of several memory elements which store the statistics of various signals that are measured using the BIST system (independent for each analog signal). The statistics contains, for example, minimum, maximum and average or sum of the monitor ADC outputs when measuring an analog signal. The SRMs may be read by the monitoring software/firmware and be utilized for a variety of purposes, such as for detecting a failure in (e.g., through threshold comparison) and/or calibrating the radar system. Sampling is generally enabled after allowing an appropriate settling time.

The skip/collect samples logic 262' is generally implemented in a digital state machine hardware (HW) which skips the first N samples collected from monitor ADC 263 (in a way of allowing settling time) and then using the subsequent M samples for further processing. Similarly, the min/max/sum logic 264' is also implemented inside digital HW. This is useful because a frame may for example have 256 chirps, each having 4 signals to monitor, each with 2 samples skip and 3 samples to use. In such a case, instead of providing A) 4×256×(2+3) ADC readings to the monitoring software, one implementation has the HW provide to firmware (FW): B) only a summary: 4 min, 4 max, 4 sum quantities. These min, max, and sum are those corresponding to the minimum of all 3×256 readings of each signal and similarly max and sum. The skip samples are ignored directly by the HW instead of forwarding to monitoring software needlessly for SW to ignore. In other embodiments A) may be done, while the statistics collector 264 of FIG. 2A and FIG. 2B does the job of B.

There is also provided a provision for a full sequence of successive analog measurements to be executed. An instruction memory 269 coupled to the BIST FSM 600 is shown receiving a chirp profile that stores all the chirp sequences needed by the BIST FSM 600 to generate the required control signals for all chirp profiles in a frame for monitoring the multiple analog signals. An example FW instruction 269a output by the instruction memory is shown that is provided to the BIST FSM 600. The instruction memory 269 can be realized by FW run by a processor to configure the BIST FSM 600 to perform as needed and processing the statistics of each analog signal to determine if the corresponding circuit has failed (e.g. by comparing against known thresholds) or to find optimum parameters for that circuit or other related circuits to improve the radar system's performance.

In one implementation the monitoring software/firmware (such as monitor software 262 in FIG. 2A and FIG. 2B) preprograms the instruction memory 269, as a sequence of several instructions of the format shown as FW instruction 269a. The BIST FSM 600 (same as the monitoring timing engine and controller 261 shown in FIGS. 2A and 2B) waits for the chirp start signal from the FMCW timing engine 240 and immediately after receiving it, reads the instruction sets such as FW instruction 269a one by one. BIST FSM 600 forwards the block control 520 (after binary to one hot translation) and broadcast generic control 510 signals to the analogic circuitry in the FMCW radar system. The BIST FSM 600 keeps those controls in one state until the instructed number of "skip samples" from monitor ADC 263 are skipped and "collect samples" number is collected from it. The BIST FSM 600 also instructs the statistics collector 264 of FIG. 2A and FIG. 2B at appropriate times to use the monitor ADC 263 outputs for the purpose of calculating min, max and sum statistics and store in a "statistics results memory". After the first signal indicated in FW instruction 269a is "finished", the BIST FSM 600 next fetches the next instruction, say an instruction 269b (not shown, but having similar format as 269a and requesting a different analog signal to be monitored) by having different block control 520 and broadcast generic control 510 signals.

The FSM 600 does what was explained for FW instruction 269a again for 269b (not shown) and stops after executing all entries of 269 (a, b, c . . . ) and starts waiting for the next chirp's "chirp Start" from the FMCW chirp timing engine 240 to indicate next chirp start. Upon receiving that, it repeats the process, thereby updating the min, max, sum by reading the previous statistics from "statistics results memory" (SRM) accordingly. For example, if the current sample is lower than that stored as the previous minimum in the SRM then it stores the current sample as the min in the SRM. Similarly for max, where instead of lower, it is higher. Similarly for sum=current sample+ sum present in SRM.

Therefore, when the entire frame gets completed, the SRM contains the min., max., sum for all signals instructed through FW instruction 269a, b, c, . . . in corresponding SRMs. the monitoring software can read these SRMs and perform threshold comparisons and averaging etc. for failure monitoring or calibration purposes.

It is noted for simplicity, the above explanation is for a frame containing identical chirps where, the SRMs are maintained for different signals corresponding to FW instruction 269a, b, c, etc. In a more sophisticated embodiment the instruction memory 269 as well as the corresponding SRMs are maintained in a way to distinguish between the profiles. For example, in FIG. 3, where SRR and MRR are alternated, say 128 SRR profile chirps interleaved with 128 MRR profile chirps, the FW instructions 269a, b, and c, are present as one set for SRR profile and another for MRR profile, and the corresponding SRMs too are kept separate. This is because, otherwise the e.g. min statistic of TX power signal/parameter may only store the min of SRR (near 3 dBm) because SRR TX power is programmed lower than MRR TX power by configuration and expectation as per MRR and SRR profile definition as described above regarding the defining of profiles.

Therefore, at the end of the frame of FIG. 3, the monitoring software 262 can read the SRMs of each signal/parameter of SRR and declare that SRR operation had failed or passed based on threshold comparisons of SRMs corresponding only to SRR and more importantly, also update the analog configurations to be applied under SRR profile based on the contents of SRMs of various signals. The monitoring SW can additionally do this similarly and independently for MRR profiles. Note here that the statistics collector 264 contains the SRMs corresponding to all programmed signals instructed by monitoring SW through FW instruction 269a, b and c (not shown) for SRR profiles and other instructions for MRR profiles too.

Advantages of disclosed embodiments include on-chip, quick and dynamic monitoring of critical analog signals for radar systems, that can be time aligned to radar chirps. Time alignment ensures that transient failures/behaviors of signals which occur during radar chirps, but not at other times, can be detected. For example, supply voltages dipping below limits only during radar chirps/frames due to peak power consumption, synthesizer control voltages exceeding valid limits only during FMCW radar chirps, transmitter's output power which can be low only during radar chirps/frames, temperature behavior during radar chirps/frames only occur during radar chirps. Less additional time needs to be spent in monitoring these signals after radar chirps/frames, if monitoring is to be performed during radar chirps/frames, thus conserving power.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method comprising:
    coupling, by a multiplexer, a first node and a second node in a frequency-modulated continuous-wave (FMCW) radar system to a built-in self-test (BIST) system;
    sampling, by the BIST system, a first analog signal from the first node and a second analog signal from the second node;
    and
    updating, by the BIST system, settings for the FMCW radar system based on the sampled first analog signal and the sampled second analog signal.

2. The method of claim 1, wherein the first node is coupled to a receiver of the FMCW radar system and the second node is coupled to a transmitter of the FMCW radar system.

3. The method of claim 1, wherein coupling the first node and the second node is based on signal monitoring information, wherein the signal monitoring information comprises timing information that causes the multiplexer to couple the first and second nodes during chirps performed by the FMCW radar system.

4. The method of claim 1, wherein coupling the first node and the second node is based on signal monitoring information, wherein the signal monitoring information comprises timing information that causes the multiplexer to couple the first and second nodes between chirps performed by the FMCW radar system.

5. The method of claim 1, wherein the settings for the FMCW radar system comprise radio frequency (RF) buffer bias settings.

6. A system comprising:
    a receiver including at least one amplifier and a mixer;
    a transmitter including a phase shifter and at least one amplifier, and
    a frequency synthesizer coupled to the mixer and coupled to the phase shifter;
    a frequency-modulated continuous-wave (FMCW) chirp timing engine for controlling a timing of operations for the frequency synthesizer;
    a multiplexer for coupling a first node and a second node in a frequency-modulated continuous-wave (FMCW) radar system to an analog-to-digital converter of a built-in self-test (BIST) system; and
    the BIST system configured to:
        sample a first analog signal from the first node and a second analog signal from the second node;
        and
        update settings for the FMCW radar system based on the sampled first analog signal and the sampled second analog signal.

7. The FMCW radar system of claim 6, wherein the first node is coupled to the receiver of the FMCW radar system and the second node is coupled to a transmitter of the FMCW radar system.

8. The FMCW radar system of claim 6, wherein the multiplexer couples the first and second nodes between chirps performed by the FMCW radar system.

* * * * *